United States Patent
Chan et al.

(10) Patent No.: US 8,950,671 B2
(45) Date of Patent: Feb. 10, 2015

(54) ITEM SCANNING IN A SHOPPING CART

(75) Inventors: Wei Cai Chan, Johor Bahru (MY); Mun Kong Chee, Singapore (SG); Kelvin Kok Yong Lim, Singapore (SG); Hoon Weng Soon, Singapore (SG); Yong Wei Wang, Singapore (SG)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 280 days.

(21) Appl. No.: 13/538,664

(22) Filed: Jun. 29, 2012

(65) Prior Publication Data

US 2014/0001258 A1    Jan. 2, 2014

(51) Int. Cl.
*G06F 19/00* (2011.01)

(52) U.S. Cl.
USPC .......................................... 235/385; 235/380

(58) Field of Classification Search
USPC ......... 235/375, 380, 383, 384, 492, 486, 487, 235/385
See application file for complete search history.

(56) References Cited

U.S. PATENT DOCUMENTS

| | | | |
|---|---|---|---|
| 3,716,697 A | | 2/1973 | Weir |
| 7,152,040 B1 * | | 12/2006 | Hawthorne et al. ............. 705/16 |
| 7,997,486 B2 | | 8/2011 | Ulrich et al. |
| 2006/0208072 A1 * | | 9/2006 | Ku et al. ....................... 235/383 |
| 2009/0063176 A1 | | 3/2009 | French et al. |
| 2012/0235817 A1 * | | 9/2012 | Forster ....................... 340/572.1 |
| 2012/0296751 A1 * | | 11/2012 | Napper ........................... 705/23 |

FOREIGN PATENT DOCUMENTS

| | | |
|---|---|---|
| EP | 2381409 | 10/2011 |
| JP | 2003256520 | 9/2003 |
| JP | 2008196657 | 8/2008 |
| KR | 20030089683 | 11/2003 |
| KR | 20060118172 | 11/2006 |
| KR | 20090016837 | 2/2009 |

OTHER PUBLICATIONS

International Search Report and Written Opinion dated Sep. 10, 2013 for PCT/JP2013/004060.
DiscoverRFID, A Grocery Cart That Checks Itself Out, Researchers are designing ways for RFID-enabled carts to improve the shopping experience, http://www.discoverrfid.org/what-is-possible/get-what-you-want/intelligent-shopping-carts.html, last visited: Jun. 26, 2012.

(Continued)

*Primary Examiner* — Thien M Le
(74) *Attorney, Agent, or Firm* — Patterson & Sheridan, LLP (57) ABSTRACT

A method for item scanning in a shopping cart includes detecting a change in a weight of one or more items within a shopping cart. The weight is sensed by a weight sensor disposed in the shopping cart. Each of the one or more items includes a radio-frequency identification (RFID) tag. The method includes switching an RFID reader to an active state and scanning RFID tags of the one or more items with the RFID reader in response to detecting the change in weight. The RFID reader is disposed on the shopping cart. The method includes switching the RFID reader to an inactive state subsequent to scanning the RFID tags with the RFID reader. The method includes determining an inventory of the one or more items based on information from the scanned RFID tags. The inventory includes an item quantity and an item identity.

20 Claims, 8 Drawing Sheets (56) References Cited

OTHER PUBLICATIONS

Ankit Anil Agarwal, RFID Based Automatic Shopping Cart, www.iiste.org/Journals/index.php/CTI/article/download/697/590, Control Theory and Informatics. vol. 1, No. 1, 2011.

Mary Catherine O'Connor, Wheeling Into the Future, http://www.rfidjournal.com/article/purchase/3540, RFID Journal-abstract, retrieved Jun. 26, 2012.

Mary Catherine O'Connor, ShopRite to Roll Out Second Test of RFID Shopping Carts, http://www.rfidjournal.com/article/print/3868, RFID Journal, retrieved Jun. 26, 2012.

Jonathon Collins, Wi-Fi Tag Maker Ramps Up, http://www.rfidjournal.com/article/view/793, RFID Journal, retrieved Jun. 26, 2012.

HBeonLabs, RFID based Shopping Cart, http://store.hbeonlabs.com/index.php?route=product/product&product_id=105, retrieved Mar. 3, 2012.

* cited by examiner

ITEM SCANNING IN A SHOPPING CART

BACKGROUND

1. Field

The subject matter disclosed herein relates to scanning items and more particularly relates to scanning items in a shopping cart.

2. Description of the Related Art

With a typical visit to the store, a shopper often spends time waiting in the checkout line. Sometimes, the time spent in line occupies a significant portion of the total time that a shopper spends at the store. The length of checkout lines may financially impact a store. Long lines may scare away potential shoppers and shorter lines may provide shoppers with more opportunity to look at and potentially purchase products.

Much of the time spent during the checkout process involves the checker removing the items from the shopping cart, sorting through each item, counting the items if necessary, scanning the items, and the like. Especially in grocery stores, where shoppers often have many items in a shopping cart, these steps may be one of the primary factors that determine line length.

BRIEF SUMMARY

A method for item scanning in a shopping cart includes, in one embodiment, detecting a change in a weight of one or more items within a shopping cart. The weight may be sensed by a weight sensor disposed in the shopping cart. Each of the one or more items may include a radio-frequency identification (RFID) tag. In one embodiment, the method includes switching an RFID reader to an active state and scanning RFID tags of the one or more items with the RFID reader in response to detecting the change in weight. The RFID reader may be disposed on the shopping cart. In one embodiment, the method includes switching the RFID reader to an inactive state subsequent to scanning the RFID tags with the RFID reader. In one embodiment, the method includes determining an inventory of the one or more items based on information from the scanned RFID tags. The inventory may include an item quantity and an item identity.

In one embodiment, detecting the change in the weight further includes detecting a change from a baseline weight prior to an item being added to the cart. In one embodiment, the method includes storing the inventory on a storage device disposed on the cart. The storage device may be in communication with the RFID reader. In certain embodiments, the method includes communicating the inventory to a separate computing device away from the cart. In a further embodiment, the separate computing device includes a checkout station. The checkout station may perform the checkout process based on the inventory. In one embodiment, the separate computing device comprises a central server. In another embodiment, the central server maintains the inventory and communicates the inventory to a checkout station during a checkout process. The checkout station may perform the checkout process based on the inventory. In another embodiment, inventory is communicated using a wireless local area network (WLAN) transmitter in communication with the RFID reader.

The method, in one embodiment, includes receiving a scanning trigger and scanning the RFID tags of the one or more items with the RFID reader in response to receiving the scanning trigger. In a further embodiment, the scanning trigger includes an external signal and/or a physical feature on a floor under the cart. The physical feature may be shaped to agitate the cart and cause the weight sensor to detect the change in the weight.

The method, in one embodiment, includes electronically displaying the inventory on a display in communication with the RFID reader. Electronically displaying the inventory may include displaying the item quantity, the item identity, an item price, an item promotion, and/or a total price. In another embodiment, the method includes detecting a difference between the weight of the one or more items and a total predicted weight in response to detecting a change in the weight of the items. The total predicted weight may be based on the item identity, the item quantity, and a predicted weight for each of the one or more items.

The method, in a further embodiment, includes issuing an alert in response to detecting the difference between the weight of the one or more items and the total predicted weight. The method, in some embodiments, includes rescanning the RFID tags of the one or more items with the RFID reader in response to detecting the difference between the weight of the one or more items and the total predicted weight. Detecting the difference between the weight of the one or more items and the total predicted weight, in one embodiment, occurs in response to one of detecting the change in the weight of the items and detecting a checkout process initiation.

An apparatus for item scanning in a shopping cart includes, in one embodiment, a detection module that detects a change in a weight of one or more items within a shopping cart. The weight may be sensed by a weight sensor disposed in the shopping cart. Each of the one or more items may include a radio-frequency identification (RFID) tag. In another embodiment, the apparatus includes a scanning module that switches an RFID reader to an active state and scans RFID tags of the one or more items with the RFID reader in response to the detection module detecting the change in weight. The RFID reader may be disposed on the shopping cart. In another embodiment, the apparatus includes an inactive state module that switches the RFID reader to an inactive state subsequent to the scanning module scanning the RFID tags with the RFID reader. In another embodiment, the apparatus includes an inventory determination module that determines an inventory of the one or more items based on information from the scanned RFID tags. The inventory may include an item quantity and an item identity.

In one embodiment, the apparatus includes a storage module that stores the inventory on a storage device disposed on the cart. The storage device may be in communication with the RFID reader. In another embodiment, the apparatus includes a communication module that communicates the inventory to a separate computing device away from the cart. In another embodiment, the apparatus includes a checkout module that receives the inventory and performs the checkout process based on the inventory. In another embodiment, the apparatus includes remote storage module that receives the inventory from the cart and stores the inventory at a central server. In another embodiment, the apparatus includes a checkout communication module that communicates the inventory from the central server to a checkout station during a checkout process. The checkout station may perform the checkout process based on the inventory.

A computer program product comprising a computer readable storage medium having computer readable program code embodied therewith for item scanning in a shopping cart includes, in one embodiment, detecting a change in a weight of one or more items within a shopping cart. The weight may be sensed by a weight sensor disposed in the shopping cart.

Each of the one or more items may include a radio-frequency-identification (RFID) tag. In another embodiment, the computer program product includes switching an RFID reader to an active state and scanning RFID tags of the one or more items with the RFID reader in response to detecting the change in weight. The RFID reader may be disposed on the shopping cart. In another embodiment, the computer program product includes switching the RFID reader to an inactive state subsequent to scanning the RFID tags with the RFID reader. In another embodiment, the computer program product includes determining an inventory of the one or more items based on information from the scanned RFID tags. The inventory may include an item quantity and an item identity.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
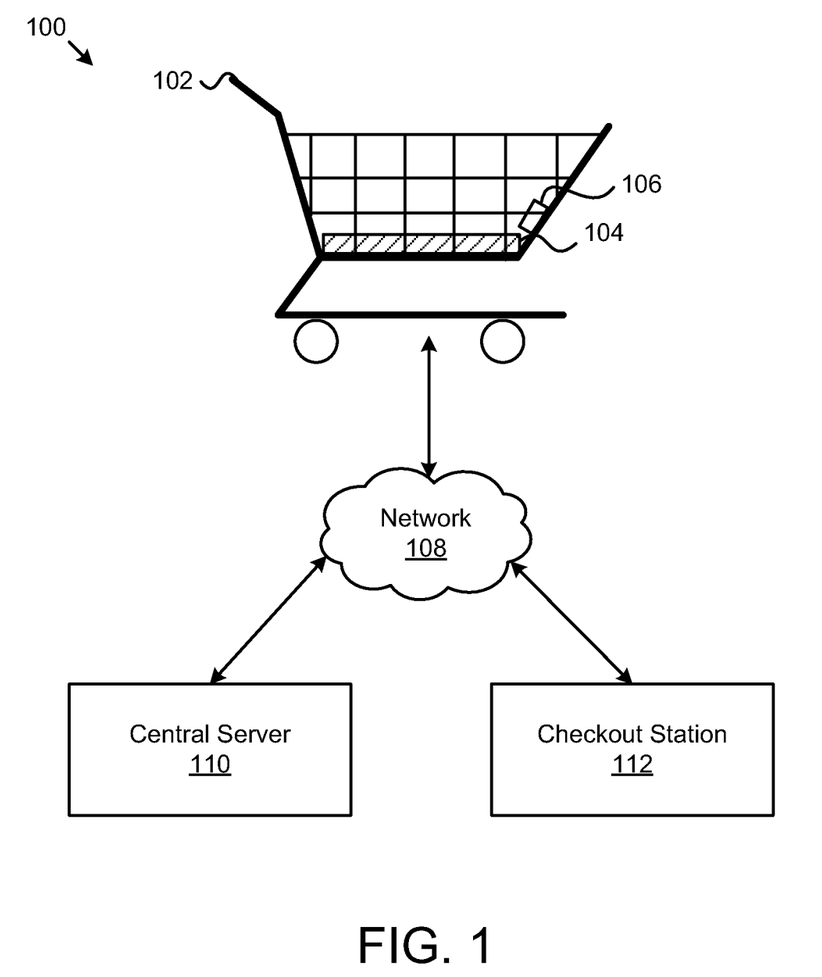
FIG. 1 is a schematic block diagram illustrating one embodiment of a system for item scanning in a shopping cart in accordance with the present invention.

FIG. 1 is a schematic block diagram illustrating one embodiment of a system 100 for item scanning in a shopping cart. In the depicted embodiment, the system 100 includes a shopping cart 102 with a weight sensor 104 and a radio-frequency identification (RFID) reader 106. The shopping cart 102 is in communication with a network 108, through, for example, a wireless transmitter as described below. As depicted, a central server 110 and a checkout station 112 may also be in communication with the network 108.

Much of the time spent during a checkout process involves the checker removing the items for purchase from a shopping cart 102, sorting through the items, counting the items if necessary, scanning the items, and the like. The shopping cart 102 in the depicted embodiment, however, facilitates an automatic and efficient checkout process that eliminates the necessity to remove and sort through items. Specifically, the shopping cart 102 includes a weight sensor 104 (e.g. a scale) disposed in the shopping cart 102 and an RFID reader 106. The weight sensor 104 may be disposed in a portion of the shopping cart 102 for holding and/or carrying items for purchase.

In one embodiment, items for purchase may each include an RFID tag. As items are placed into or removed from the shopping cart 102, the weight sensor 104 may detect a weight change. In one embodiment, the RFID reader 106 scans the RFID tags on items in the shopping cart 102 in response to the weight change to create an inventory that includes the identity of the items, the quantity of the items, and the like. Therefore, the shopping cart 102 provides a mobile scanning mechanism within the shopping cart 102 itself. Furthermore, in one embodiment, the RFID reader 106 is maintained in a low-power state between item scans, extending battery life of the RFID reader 106.

The inventory may be stored at the shopping cart 102 (e.g. on storage local to the shopping cart 102) and/or transmitted through the network 108 (using a transmitter as described below), to the central server 110 and/or the checkout station 112. Consequently, each time an item is removed or added to the shopping cart 102, the inventory may be kept current and, when the shopper proceeds to checkout, the checkout station 112 may use the inventory to discover the identity and quantity of items in the shopping cart 102 and eliminate the need to sort through and scan items by hand.

Figure 2:
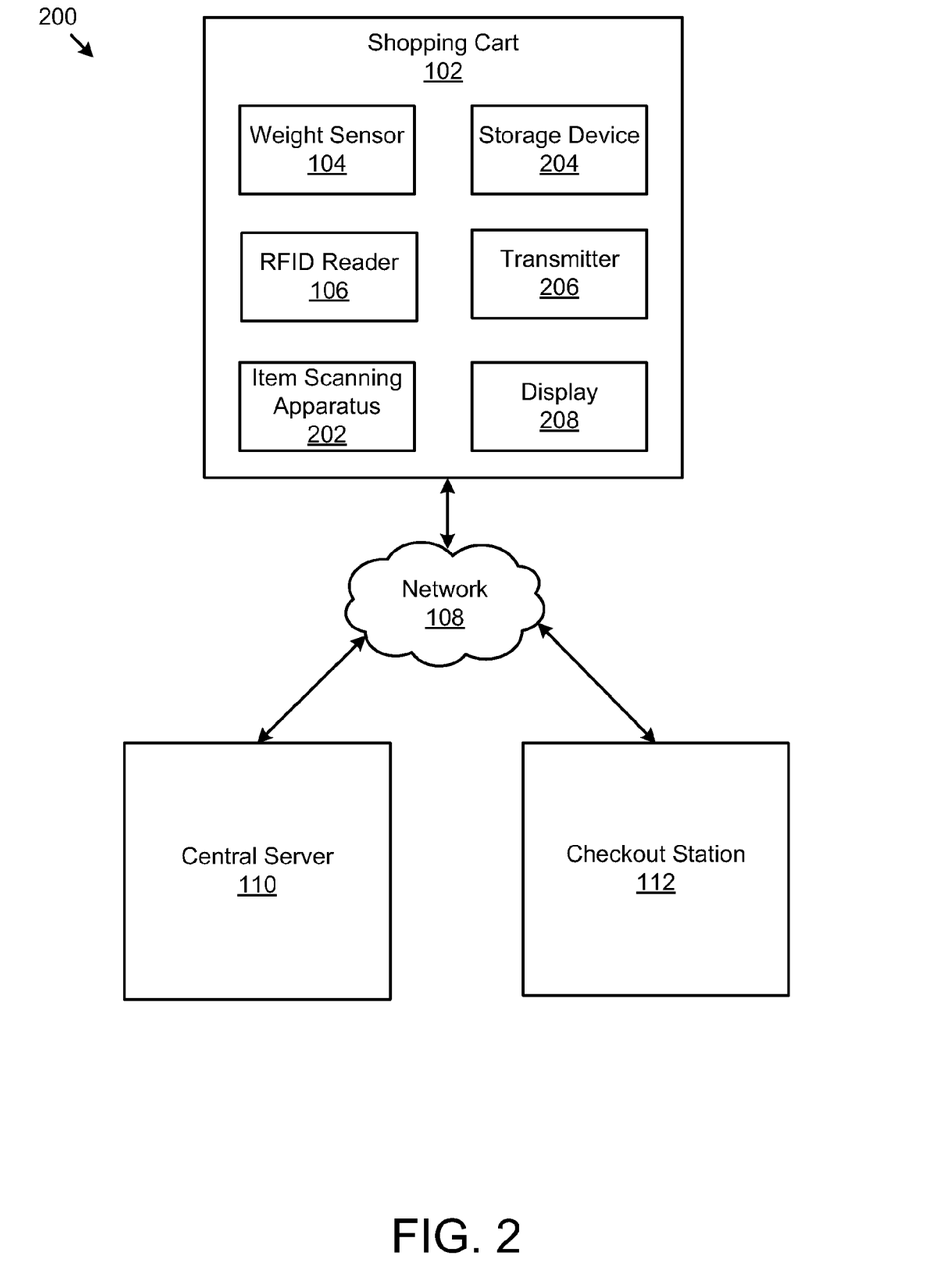
FIG. 2 is a schematic block diagram illustrating another embodiment of a system for item scanning in a shopping cart in accordance with the present invention.

FIG. 2 depicts another embodiment of a system 200 for item scanning in a shopping cart 102. The system 200 includes the shopping cart 102 with the weight sensor 104 and the RFID reader 106, the network 108, the central server 110, and the checkout station 112 of FIG. 1. The shopping cart 102 includes an item scanning apparatus 202, a storage device 204, a transmitter 206, and a display 208. The shopping cart 102, in one embodiment, includes a cart for holding, carrying, storing, and/or transporting items and/or merchandise. The shopping cart 102 may be designed for use in a store such as a grocery store, home improvement store, or other retail establishment. The shopping cart 102 may include an integrated basket, as depicted, or may have other configurations suitable to carry items, such as, but not limited to, a flatbed dolly, a wagon, or the like. The items for placement in the cart may be items, goods, and/or merchandise for purchase in the store. Examples of items include, but are not limited to, groceries, home improvement goods, paper products, and the like.

The weight sensor 104 may include a weighing scale and may be embodied by a digital scale, a strain gauge scale, and/or the like. The weight sensor 104 may be battery powered. The RFID reader 106, in one embodiment, scans RFID tags of items in the shopping cart 102. In one embodiment, scanning RFID tags includes reading, referencing, and/or obtaining electronically stored information from the RFID tags as would be known by one of ordinary skill in the art in light of the present disclosure. In another embodiment, each RFID tag includes an RF transmitter and receiver. In another embodiment, the RFID reader 106 transmits a signal which is received by the RFID tag. The RFID tag responds to the RFID reader 106 with information stored in the RFID tag. In another embodiment, the range of the RFID tag is limited to approximate an area of the shopping cart 102, such that the RFID reader 106 does not scan items on nearby shelves or in other shopping carts. In another embodiment, items in a store include RFID tags. The RFID tag of each item may include an item identifier such as a stock-keeping unit (SKU) number, a price, an item name, any available promotions, and/or the like. The RFID reader 106 may be powered by an onboard battery.

The item scanning apparatus 202, in one embodiment, communicates with the weight sensor 104 and the RFID reader 106. The item scanning apparatus 202 may use the weight sensor 104 to detect a change in weight of one or more items in the shopping cart 102. The item scanning apparatus 202 may switch the RFID reader 106 to an active state and trigger the RFID reader 106 to scan the items in the shopping cart 102 in response to detecting the change in weight. The item scanning apparatus 202 may switch the RFID reader 106 to an inactive state subsequent to the RFID reader 106 scanning the items to conserve battery life of the RFID reader 106. In one embodiment, the item scanning apparatus 202 determines an inventory of the one or more items, including an item identity and item quantity of the items. In one embodiment, the item scanning apparatus 202 stores the inventory on a storage device 204 on the shopping cart 102. The storage device 204 may comprise volatile memory such as Static RAM (SRAM) or Dynamic RAM (DRAM) or non-volatile memory such as flash memory. The storage device 204 may be in communication with the item scanning apparatus 202 and disposed on the shopping cart 102. The inventory, in certain embodiments, is maintained on the shopping cart 102 and transferred and/or transmitted to the checkout station 112 as part of the checkout process.

In certain embodiments, the shopping cart 102 includes a transmitter 206. In these embodiments, the item scanning apparatus 202 may transmit the inventory to a central server 110. For example, the item scanning apparatus 202 may transmit the inventory periodically, after each scan of the RFID reader 106, or the like. In one embodiment, the transmitter 206 includes a wireless local area network (WLAN) transmitter or other wireless transmitter.

In certain embodiments, the shopping cart 102 includes a display 208. The display 208 may display all or a portion of the inventory to the shopper such as, for example, an item list, an item quantity, a cost of each item, a total cost, available promotions, and/or the like.

The item scanning apparatus 202 may be embodied as software, such as a software application stored on a computer readable storage medium for execution by a processor. The item scanning apparatus 202 may be embodied by hardware, such as logic hardware. In one embodiment, the item scanning apparatus 202 comprises a combination of hardware and software. In one embodiment, the shopping cart 102 includes a computing device for execution of the item scanning apparatus 202. The computing device may include a processor and a memory that stores computer readable programs. In one embodiment, the item scanning apparatus 202, the RFID reader 106, the storage device 204, the transmitter 206, and the display 208 may be separately embodied. In one embodiment, one or more of these components are integrated with one or more other components. For example, the item scanning apparatus 202, RFID reader 106, storage device 204, and the transmitter 206 may be integrated with the display 208 (e.g. in a common housing).

The network 108 may comprise a communications network. In one embodiment, at least a portion of the network 108 includes a wireless network such as a Wireless LAN ("WLAN") or any other similar communications network. The network 108 may include hardware such as routers, switches, cabling, and other communication hardware.

The central server 110, in one embodiment, communicates with the network 108 and receives the inventory from the item scanning apparatus 202. The central server 110 may maintain and/or store inventories for a plurality of shopping carts 102. In one embodiment, the central server 110 communicates the inventory to a checkout station 112 during a checkout process.

The central server 110 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the central server 110. The storage may include a Solid State Drive ("SSD"), a hard disk drive ("HDD"), an optical storage device, a holographic storage device, a micromechanical storage device, or other non-volatile data storage device.

The checkout station 112, in one embodiment, performs a checkout process using the inventory. In another embodiment, the checkout station 112 receives the inventory from the central server 110. In certain embodiments, the item scanning apparatus 202 may communicate the inventory directly to the checkout station 112. The checkout station 112 may use the inventory during the checkout process to accelerate the checkout process. For example, in one embodiment, the inventory includes a list of each item and a quantity of each item along with a running cost total. The checkout station 112 may, as part of the checkout process, obtain the inventory, accept payment, and finalize the transaction, eliminating the need for a checker to sort through the items.

In one embodiment, the checkout station 112 includes a computing device, a cash register, a credit card machine, and/or the like. In another embodiment, a cashier operates the checkout station 112. In other embodiments, the checkout station 112 is semi-automated such that the shopper performs one or more of the checkout steps.

Figure 3A:
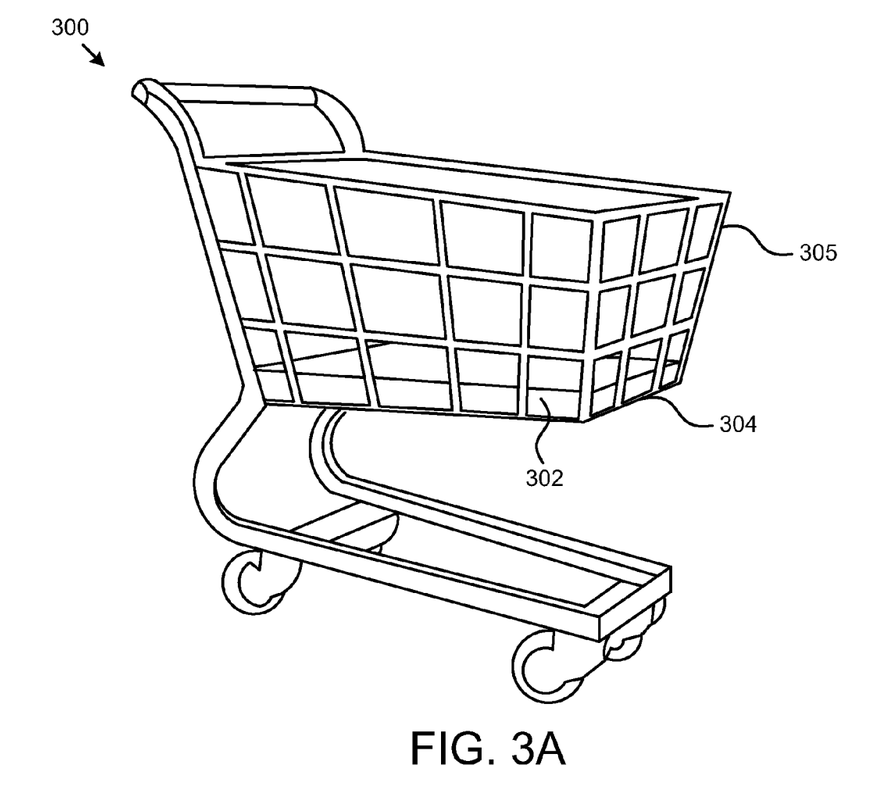
FIG. 3A is a perspective view illustrating one embodiment of a shopping cart with a weight sensor in accordance with the present invention.

FIG. 3A is a perspective view illustrating one embodiment of a shopping cart 300 with a weight sensor 302. The shopping cart 300 may include one embodiment of the shopping cart 102 depicted in FIGS. 1 and 2. In the depicted embodiment, the shopping cart 300 includes a basket 305. The weight sensor 302 is disposed along a bottom surface 304 of the basket 305. In the depicted embodiment, items may be placed into the basket 305 onto the weight sensor 302. In another embodiment, the shopping cart 300 includes addition areas without the weight sensor 302, such as, for example, a child carrying area.

Figure 3B:
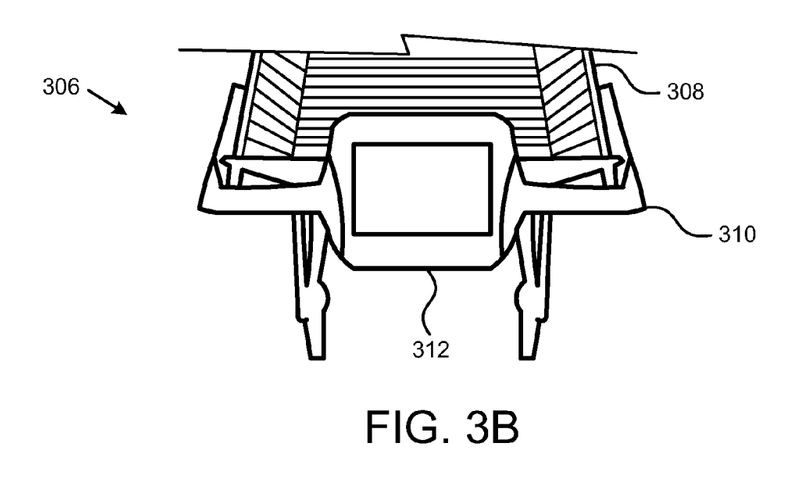
FIG. 3B is a schematic block diagram illustrating one embodiment of a display disposed on a shopping cart in accordance with the present invention.

FIG. 3B is a schematic block diagram illustrating one embodiment of a display 312 coupled to a shopping cart 306. The display 312 may include one embodiment of the display 208 described above in relation to FIG. 2. In certain embodiments, the display 312 may display all or a portion of the inventory to the shopper such as, for example, an item list, an item quantity, a cost of each item, a total cost, and/or the like. The display 312 may also display available promotions, cost savings and the like. In one embodiment, the display 312 comprises a liquid crystal display (LCD), a plasma display, or the like. In the depicted embodiment, the display 312 is positioned on a shopping cart handle 310, although in other embodiments, the display 312 may be positioned in other locations on the shopping cart 306.

Figure 4:
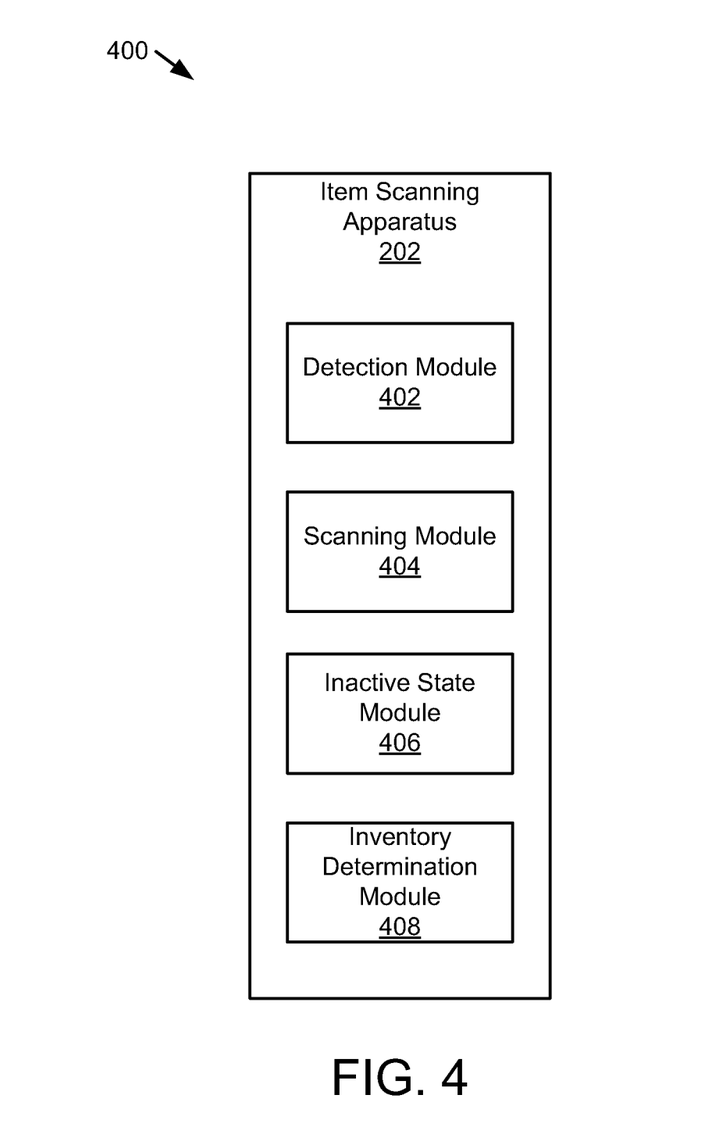
FIG. 4 is a schematic block diagram illustrating one embodiment of an apparatus for item scanning in a shopping cart in accordance with the present invention.

FIG. 4 is a schematic block diagram illustrating one embodiment of an apparatus 400 for item scanning in a shopping cart 102. The description of the apparatus 400 refers to elements of FIGS. 1-2, like numbers referring to like elements. In one embodiment, the apparatus 400 includes the item scanning apparatus 202 with a detection module 402, a scanning module 404, an inactive state module 406, and an inventory determination module 408, which are described below.

The detection module 402, in one embodiment, detects a change in a weight in a shopping cart 102. Initially, in one embodiment, the detection module 402 detects a weight of one or more items within a shopping cart 102 or a baseline weight in the shopping cart 102 prior to an item being added to the shopping cart 102. In another embodiment, the detection module 402 determines the weight using a weight sensor 104. In certain embodiments the weight sensor 104 is disposed in the shopping cart 102, such as in a bottom surface of a basket or other item carrying area, as described above. In one embodiment, each of the items includes a radio-frequency identification (RFID) tag.

In one embodiment, the detection module 402 detects a change in a weight of the one or more items within a shopping cart 102. For example, the detection module 402 may detect a change in the weight based on an addition to, or a removal from, the one or more items in the shopping cart 102. The detection module 402 may detect a change in weight in response to a shopper adding an item to other items in the shopping cart 102 that rest on the weight sensor 104. In another embodiment, the detection module 402 detects a change in weight by detecting a change from the baseline weight. For example, if the weight sensor 104 has no items on the surface of the weight sensor 104 and a shopper places an item on the weight sensor 104, the detection module 402 may detect a change in the weight from the baseline weight. The detection module 402 may be in communication with the weight sensor 104 to determine the change in weight. In one embodiment, the detection module 402 stores a last known weight in memory and periodically checks the weight sensor 104 to determine whether a current weight is different from the last known weight. In another embodiment, the weight sensor 104 signals the detection module 402 in response to a change in weight.

In one embodiment, the detection module 402 detects a change in weight in response to detecting a change in weight above a certain threshold. For example, the detection module 402 may ignore minor fluctuations in weight caused by, for example, an uneven floor and/or wobbly wheel on the shopping cart 102. If the detection module 402 detects a fluctuation in the weight below the threshold, the detection module 402 may disregard the detected fluctuations. However, if the fluctuations are above the threshold, the detection module 402 may detect a change in weight.

The scanning module 404, in one embodiment, scans RFID tags of one or more items in the shopping cart 102. The scanning module 404, in one embodiment, uses an RFID reader 106 to perform the scanning. In another embodiment, the RFID reader 106 is disposed on the shopping cart 102 and is powered by an onboard battery. In another embodiment, the scanning module 404 maintains the RFID reader 106 in an inactive state in between scans. In another embodiment, an RFID reader 106 in an active state—a state in which the RFID reader 106 is capable of searching for and/or scanning RFID tags—consumes power and shortens battery life of the RFID reader 106. The inactive state may include a low power state to conserve battery life of the RFID reader 106 in between scans. In one embodiment, the inactive state is a state in which the RFID reader 106 is powered on, but the scanning capabilities of the RFID reader 106 are deactivated such that the RFID reader 106 is in a standby, and/or a low power consumption mode. In another embodiment, an RFID reader 106 in the inactive state is not powered on.

The scanning module 404, in one embodiment switches the RFID reader 106 to an active state and scans RFID tags of the one or more items in the shopping cart 102 in response to the detection module 402 detecting the change in the weight of the items. In another embodiment, the active state includes a state in which the RFID reader 106 is capable of searching for and/or scanning RFID tags. The scanning module 404 may switch the RFID reader 106 to the active state by signaling the RFID reader 106 to become active, exit the standby state, or the like. In another embodiment, the scanning module 404 may switch the RFID reader 106 to the active state by powering on the RFID reader 106.

In one embodiment, the scanning module 404 signals and/or enables the RFID reader 106 to begin scanning. As described above, the RFID reader 106 may read, reference, and/or obtain electronically stored information from the RFID tags. In another embodiment, each RFID tag includes an RF transmitter and receiver. In another embodiment, the RFID reader 106 transmits a signal which is received by the RFID tag. The RFID tag responds to the RFID reader 106 with information stored in the RFID tag. The scanning module 404 may obtain information from the RFID tags for each item. The information may include, but is not limited to, an item identity, an item price, an item name, an item promotion (e.g. a sale or coupon), and the like.

In one embodiment, the scanning module 404 receives a scanning trigger and scans the RFID tags of the one or more items with the RFID reader 106 in response to receiving the scanning trigger. For example, in certain embodiments, an item may have been added to the shopping cart 102, such as an item of little weight (e.g. a gift card) that may have not caused the detection module 402 to detect a change in weight. If a subsequent item is added or removed from the shopping cart 102 and the detection module 402 detects the change in weight, the scanning module 404 would scan the RFID tags of the items in the shopping cart 102 including the lighter item. However, if the shopper is finished shopping and does not add or remove another item, the trigger may cause the scanning module 404 to make a last scan before the shopper begins the checkout process such that all items are scanned.

In certain embodiments, the scanning trigger is an external signal. For example, in one embodiment, the shopper passes in proximity to a radio signal, a signal over the network 108, or the like before reaching the checkout stations. In one embodiment, the external signal is transmitted by the checkout station 112 to cause the scanning module 404 to perform a scan. The external signal may trigger the scanning module 404 to make a last scan of the items in the shopping cart 102 before checkout. In one embodiment, the scanning trigger is a physical feature on a floor under the shopping cart 102. The physical feature may be shaped to agitate the shopping cart 102 and cause the weight sensor 104 to detect the change in the weight. The physical feature may be a bump or a divot in front of the checkout stations 112.

The inactive state module 406, in one embodiment, switches the RFID reader 106 to an inactive state subsequent to the scanning module 404 scanning the RFID tags with the RFID reader 106. Switching the RFID reader 106 to the inactive state may include signaling the RFID reader 106 to become inactive, enter a standby state, or the like. In one embodiment, the inactive state module 406 may switch the RFID reader 106 to the inactive state by powering off the RFID reader 106. The inactive state module 406 may receive a signal from the scanning module 404 once the scanning module 404 completes a scan of the RFID tags.

The inventory determination module 408, in one embodiment, determines an inventory of the one or more items based on information from the scanned RFID tags. The inventory may include what items are in the shopping cart 102 and how many of each item. Therefore, in one embodiment, the inventory includes an item quantity (e.g. a total number of items and/or a number of a particular item) and an item identity (e.g. the identity of the items in the shopping cart 102). In certain embodiments, the inventory includes an item price, an item promotion, and/or a total price.

In one embodiment, the shopping cart 102 includes a unique identifier that distinguishes the shopping cart 102 from other shopping carts 102 in the store. The unique identifier may be associated with the inventory, such as in the central server 110. The shopping cart 102 may be marked with the unique identifier. For example, the unique identifier may be affixed to the shopping cart 102 as a barcode to be scanned at checkout or with its own unique RFID tag.

Figure 5:
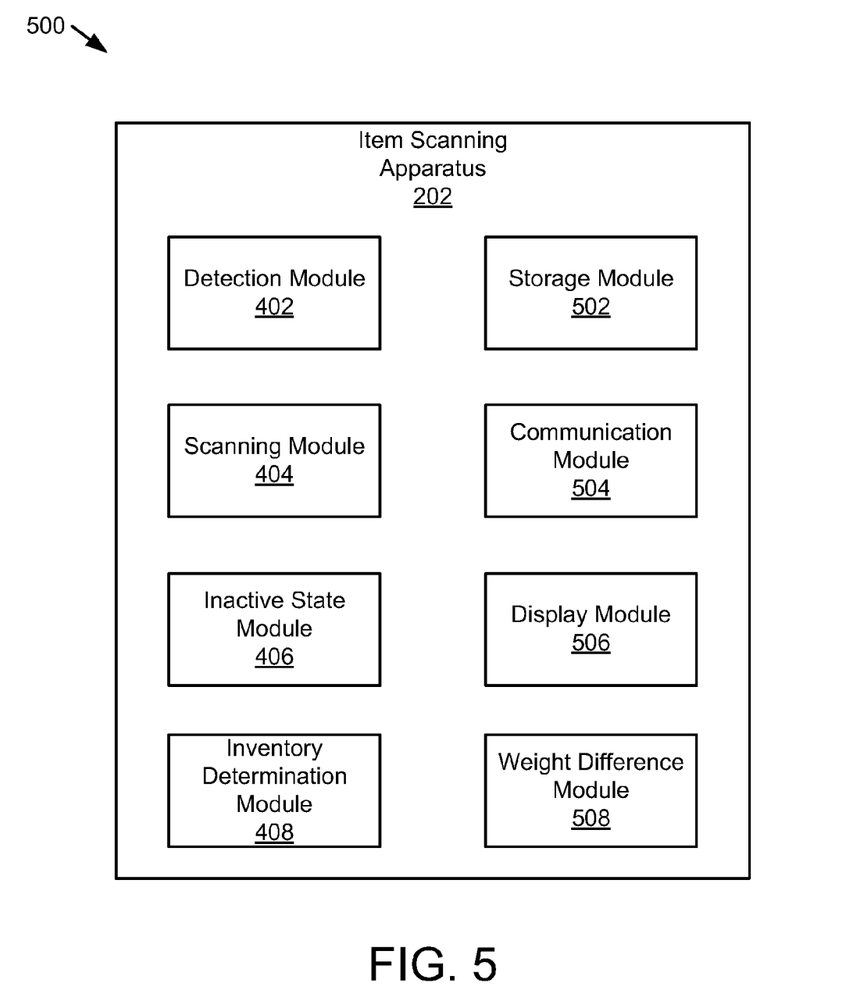
FIG. 5 is a schematic block diagram illustrating another embodiment of an apparatus for item scanning in a shopping cart in accordance with the present invention.

FIG. 5 is a schematic block diagram illustrating another embodiment of an apparatus 500 for item scanning in a shopping cart 102. The description of the apparatus 500 refers to elements of FIGS. 1-2, like numbers referring to like elements. The apparatus 500 includes an embodiment of the item scanning apparatus 202 with a detection module 402, a scanning module 404, an inactive state module 406, and an inventory determination module 408, which are substantially similar to those described in relation to the apparatus 400 of FIG. 4. In addition, the embodiment of the item scanning apparatus 202 may include one or more of a storage module 502, a communication module 504, a display module 506, and a weight difference module 508, which are described below.

The storage module 502, in one embodiment, stores the inventory on a storage device 204 disposed on the shopping cart 102. The storage device 204 may be in communication with the RFID reader 106 to receive information from the RFID reader 106. As described above, the storage device 204 may include volatile memory such as Static RAM N (SRAM)

or Dynamic RAM (DRAM) or non-volatile memory such as flash memory. The storage module 502 may temporarily store the inventory before the inventory is communicated to the central server 110 and/or a checkout station 112. In one embodiment, the inventory is persisted in the storage device 204 through a shopping session. A shopping session may refer to a period of time beginning when a shopper retrieves a shopping cart 102 and lasting up until a checkout process involving the shopping cart 102. In another embodiment, the storage module 502 interfaces with a checkout station 112 to directly communicate the inventory to the checkout station 112 during the checkout process. In another embodiment, the storage device 204 is removable, such that a checker or the shopper may insert the storage device 204 into the checkout station 112 at checkout to retrieve the inventory.

The communication module 504, in one embodiment, communicates the inventory to a separate computing device away from the shopping cart 102. The communication module 504 may communicate the inventory using a transmitter 206 such as that described above. Specifically, in one embodiment, the inventory is communicated using a wireless local area network (WLAN) transmitter in communication with the RFID reader 106 or other wireless transmitter.

In one embodiment, the separate computing device is a checkout station 112. The checkout station 112 may perform the checkout process based on the inventory. In one embodiment, the separate computing device is a central server 110. In another embodiment, the central server 110 maintains the inventory. For example, the central server 110 may receive notifications from the communication module 504 with updated inventory. The central server 110 may, in turn, communicate the inventory to a checkout station 112 during a checkout process. The checkout station 112 may perform the checkout process based on the inventory.

For example, a shopper may add items to the shopping cart 102, the detection module 402 may detect a change in weight and the scanning module 404 may scan RFID tags for items in the shopping cart 102. The inventory determination module 408 may determine an inventory and the communication module 504 may communicate the inventory to the central server 110, which maintains and stores the inventory. Once the shopper reaches the checkout station 112, the inventory for the particular shopping cart 102 may be retrieved with the unique identifier for the shopping cart 102. For example, a checker at the checkout station 112 may scan a barcode with the shopping cart's 102 unique identifier, enter in the unique identifier, or the like. The checkout station 112 may request the inventory from the central server 110 and receive the inventory from the central server 110. The checkout station 112 may then, having the inventory predetermined, accept payment and complete the checkout process.

The display module 506, in one embodiment, electronically displays the inventory on a display 208 in communication with the RFID reader 106. In another embodiment, electronically displaying the inventory includes displaying the item quantity, the item identity, an item price, an item promotion, and/or a total price. As described above, the shopping cart 102 may have a display 208 coupled to the shopping cart 102. The shopper may view a list of the items in the cart, a running total, promotions, and the like.

The weight difference module 508, in one embodiment, makes a weight difference determination to detects whether a difference exists between an actual weight and a total predicted weight. The total predicted weight, in one embodiment, is an approximation of what the items in the shopping cart 102 should, or are expected to weigh. The total predicted weight may be based on the item identity, the item quantity, and a predicted weight for each item in the shopping cart 102. For example, if a pack of batteries and a package of cookies have a predicted weight of a half pound total and the actual weight in the shopping cart 102 is two pounds, the weight difference module 508 may detect a difference between the actual weight and the total predicted weight. A shopper may, for example, remove an RFID tag from an item in the shopping cart 102. The shopping cart 102 may still carry the item, however, the RFID tag would not be scanned and the item would be left out of the inventory. In another embodiment, a shopper may remove an RFID tag from a less expensive item and place it on a more expensive item and then place the mismarked item in the shopping cart 102. Therefore, the weight difference module 508 monitors for a difference between what the items should weigh and the actual weight.

In one embodiment, the weight difference module 508 makes the weight difference determination in response to the detection module 402 detecting a change in the weight of the items. For example, the weight difference module 508 may make the weight difference determination after each weight change detection. In another embodiment, the weight difference module 508 makes a weight difference determination in response to detecting a checkout initiation. The checkout initiation may comprise an external signal such as that described above in relation to the scanning trigger. For example, as a shopper nears a checkout station, a signal in proximity to the checkout station may indicate a checkout initiation and trigger the weight difference module 508 to make the weight difference determination before the shopper checks out.

In one embodiment, the weight difference module 508 issues an alert in response to detecting the difference between the weight of the one or more items and the total predicted weight. The alert may include an alert on the display 208 of the shopping cart 102, an audible alert emitted from a speaker on the shopping cart 102, a message to a cashier, a message to a store owner or manager, and/or the like. In one embodiment, the scanning module 404 rescans the RFID tags of the one or more items with the RFID reader 106 in response to detecting the difference between the weight of the one or more items and the total predicted weight. For example, the weight difference module 508 may signal the scanning module 404 to rescan the items to recheck the weight total.

Figure 6A:
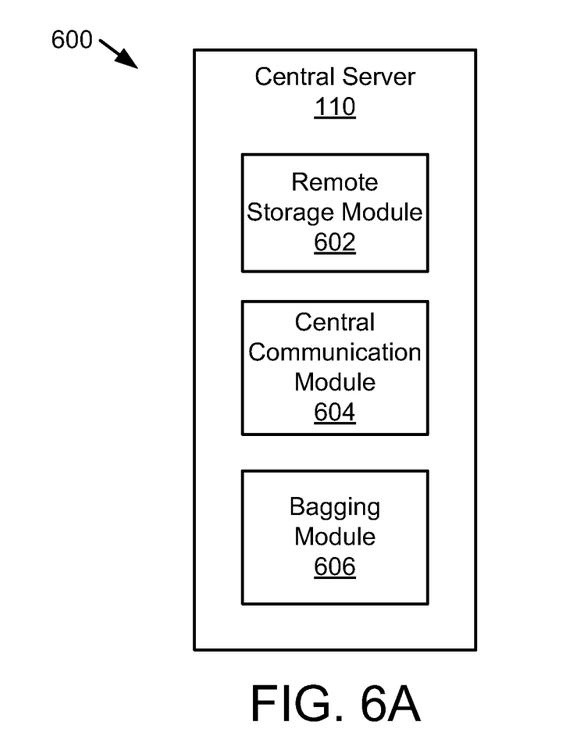
FIG. 6A is a schematic block diagram illustrating one embodiment of central server in accordance with the present invention.

FIG. 6A is a schematic block diagram illustrating one embodiment of a central server 110. The description of the central server 110 refers to elements of FIGS. 1-2, like numbers referring to like elements. The central server 110 may be substantially similar to the central server 110 depicted in FIGS. 1 and 2. The central server 110 includes a remote storage module 600, a central communication module 602, and a bagging module 608.

The remote storage module 600, in one embodiment, receives the inventory from the shopping cart 102 (e.g. the communication module 504) and stores the inventory at a central server 110. The remote storage module 600 may include volatile memory such as Static RAM (SRAM) or Dynamic RAM (DRAM) or non-volatile memory such as flash memory, a hard disk drive, or the like to store the inventory. The remote storage module 600 may associate the inventory for a particular shopping cart 102 with the unique identifier for the shopping cart 102. The remote storage module 600 may store the inventory in a database, a flat file, or the like. The remote storage module 600 may store the identity of items in the shopping cart 102, the quantity of items, the price of items, a total price of items, promotions or coupons, and the like. The remote storage module 600 may compute a running price total of the items, apply coupons and the like.

The central communication module 602, in one embodiment, communicates the inventory from the central server 110 to a checkout station 112 during a checkout process. The checkout station 112 may perform the checkout process based on the inventory. In one embodiment the central communication module 602 receives a request from a particular checkout station 112 to communicate the inventory for a particular shopping cart 102. The central communication module 602 may communicate the inventory in response to the request. The central communication module 602 may include a wireless local area network (WLAN) transmitter, a wired connection to a checkout station 112, or the like.

The bagging module 608, in one embodiment, determines a bagging requirement based on the inventory. The bagging requirement may include a prediction of a number of bags and/or a bag type based on the items identities and/or item quantities in the inventory. For example, as the inventory is updated on the central server 110, the bagging module 608 may consider a size and/or weight of each item as well as item characteristics, such as whether a particular item needs its own bag or is fragile (e.g. eggs). The central communication module 602 may also communicate the bagging requirement to the checkout station 112.

Figure 6B:
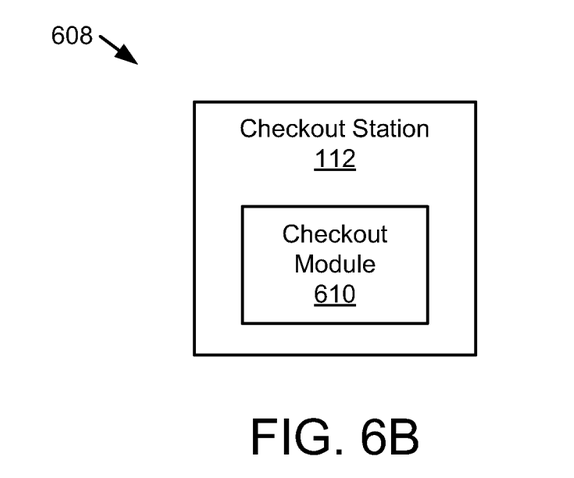
FIG. 6B is a schematic block diagram illustrating one embodiment of a checkout station in accordance with the present invention.

FIG. 6B is a schematic block diagram illustrating one embodiment of a checkout station 112. The description of the checkout station 112 refers to elements of FIGS. 1-2, like numbers referring to like elements. The checkout station 112 may be substantially similar to the checkout station 112 depicted in FIGS. 1 and 2. The checkout station 112 includes a checkout module 610. The checkout module 610, in one embodiment, receives the inventory and performs the checkout process based on the inventory.

In one embodiment, the checkout module 610 receives the inventory from the central server 110. The checkout module 610 may obtain a unique identifier for the shopping cart 102 and request the inventory for the shopping cart 102 from the central server 110. The checkout module 610 may receive the inventory from the central server 110. In another embodiment, the checkout module 610 receives the inventory directly from the shopping cart 102 (e.g. the storage module 502). For example, the communication module 504 may communicate the inventory directly to the checkout module 610 as described above.

In one embodiment, the checkout module 610 calculates a total cost, applies coupons, accepts payment including receiving credit card or other payment information from the shopper, and the like. In one embodiment, the total cost and the coupons information is already included in the inventory and the checkout module 610 receives and applies payment for the checkout process.

Figure 7:
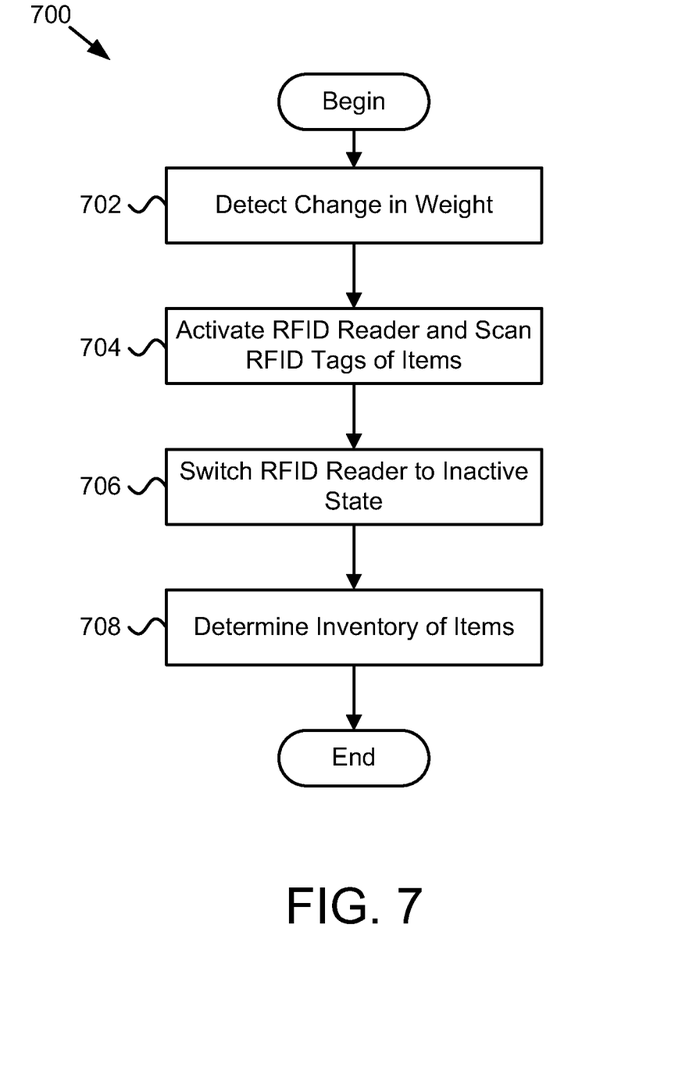
FIG. 7 is a schematic flow chart diagram illustrating one embodiment of a method for item scanning in a shopping cart in accordance with the present invention.

FIG. 7 is a schematic flow chart diagram illustrating one embodiment of a method 700 for item scanning in a shopping cart 102. The description of the method 700 refers to elements of FIGS. 1-2 and 4, like numbers referring to like elements. The method 700 begins and the detection module 402 detects 704 a change in a weight of one or more items within a shopping cart 102. The weight may sensed by a weight sensor disposed in the shopping cart 102. Furthermore, each of the one or more items, in one embodiment, includes a radio-frequency identification (RFID) tag. The scanning module 404 switches an RFID reader to an active state and scans 706 RFID tags of the one or more items with the RFID reader 106 in response to detecting the change in weight. In one embodiment, the RFID reader is disposed on the shopping cart 102. The inactive state module switches the RFID reader to an inactive state. The inventory determination module 408 determines 708 an inventory of the one or more items based on information from the scanned RFID tags. The inventory may include an item quantity and an item identity. Then, the method 700 ends.

Figure 8:
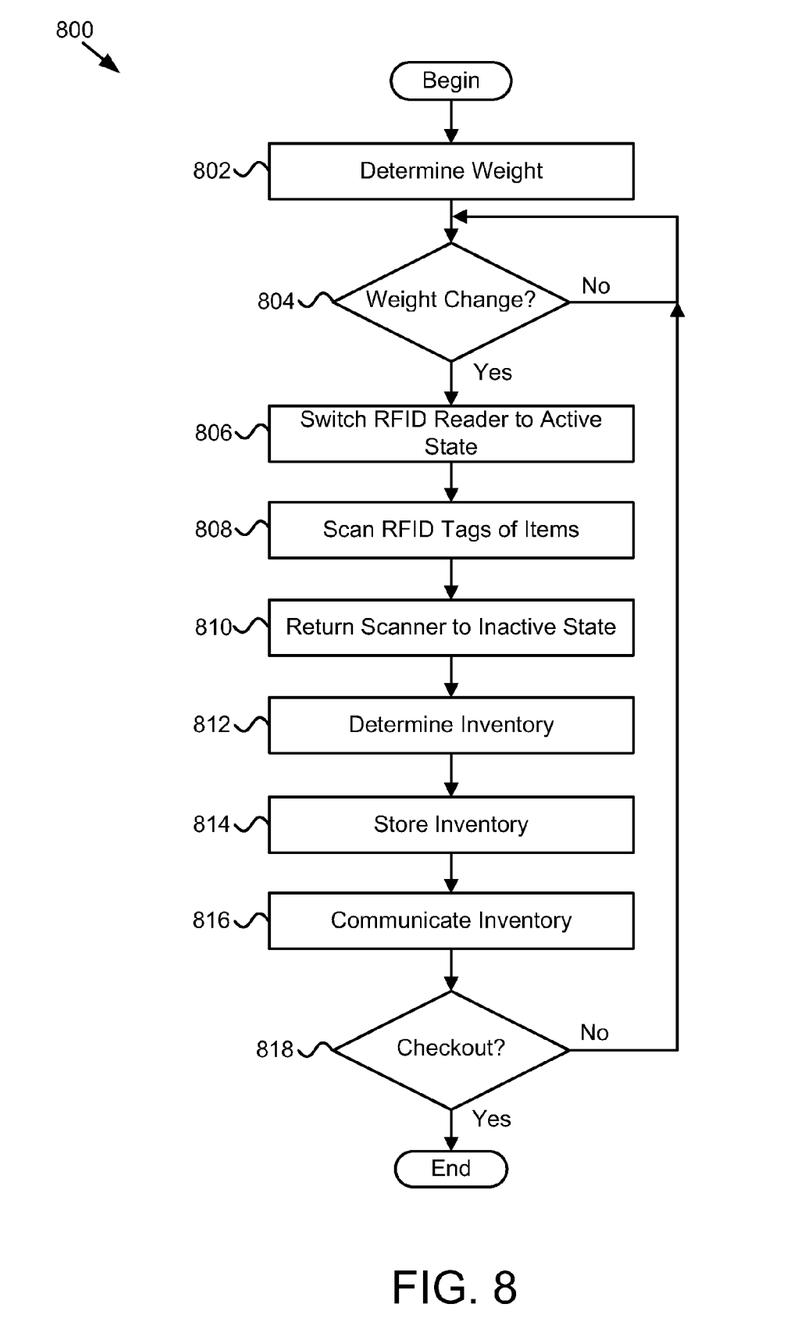
FIG. 8 is a schematic flow chart diagram illustrating one embodiment of a method for item scanning in a shopping cart in accordance with the present invention.

FIG. 8 is a schematic flow chart diagram illustrating one embodiment of a method 800 for item scanning in a shopping cart 102. The description of the method 800 refers to elements of FIGS. 1-2 and 4-6B, like numbers referring to like elements. The method 800 begins and the detection module 402 determines 802 a weight in a shopping cart 102. If no items have been added to the shopping cart 102, in one embodiment, the detection module 402 determines a baseline weight prior to an item being added to the shopping cart 102. Otherwise the detection module 402 determines a weight of one or more items within the shopping cart 102. In one embodiment, the weight is determined using a weight sensor 104 disposed in the shopping cart 102. In some embodiments, each of the one or more items includes a radio-frequency identification (RFID) tag. If the detection module 402 fails 804 to detect a change in the weight, the detection module 402 continues 804 to monitor for a change in the weight (e.g. the weight of the items or the baseline weight).

If the detection module 402 detects 804 the change in the weight, the scanning module 404 switches 806 an RFID reader 106 to an active state. The RFID reader 106 may be disposed on the shopping cart 102. The scanning module 404 scans 808 RFID tags of the items with the RFID reader 106 in response to detecting the change in weight. The inactive state module 406 returns 810 the RFID reader 106 to an inactive state. The inventory determination module 408 determines 812 an inventory of the items based on information from the scanned RFID tags. The storage module 502 stores 814 the inventory on a storage device 204 disposed on the shopping cart 102. The communication module 504 communicates 816 the inventory. In one embodiment, the communication module 504 communicates the inventory to a central server 110 that maintains the inventory. In another embodiment, the communication module 504 communicates the inventory to a checkout station 112 which performs a checkout process based on the inventory.

If the checkout module 610 begins 818 the checkout process, the method 800 ends. Otherwise, the method 800 returns to step 804 and the detection module 402 monitors 804 for a change in the weight.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   detecting a change in a weight of one or more items within a shopping basket, the weight sensed by a weight sensor disposed in the shopping basket, each of the one or more items comprising a radio-frequency identification (RFID) tag;
   switching an RFID reader to an active state and scanning RFID tags of the one or more items with the RFID reader in response to detecting the change in the weight, the RFID reader disposed on the shopping basket;
   switching the RFID reader to an inactive state subsequent to scanning the RFID tags with the RFID reader; and
   determining an inventory of the one or more items based on information from the scanned RFID tags, the inventory comprising an item quantity and an item identity.

2. The method of claim 1, wherein detecting the change in the weight further comprises detecting a change from a baseline weight, the baseline weight being prior to an item being added to the shopping basket.

3. The method of claim 1, further comprising storing the inventory on a storage device disposed on the shopping basket, the storage device in communication with the RFID reader.

4. The method of claim 1, further comprising communicating the inventory to a separate computing device away from the shopping basket.

5. The method of claim 4, wherein the separate computing device comprises a checkout station, the checkout station performing the checkout process based on the inventory.

6. The method of claim 4, wherein the separate computing device comprises a central server, wherein the central server maintains the inventory and communicates the inventory to a checkout station during a checkout process, the checkout station performing the checkout process based on the inventory.

7. The method of claim 4, wherein the inventory is communicated using a wireless local area network (WLAN) transmitter in communication with the RFID reader.

8. The method of claim 1, further comprising receiving a scanning trigger and scanning the RFID tags of the one or more items with the RFID reader in response to receiving the scanning trigger.

9. The method of claim 8, wherein the scanning trigger comprises one of:
an external signal; and
a physical feature on a floor under a shopping cart that includes the shopping basket, the physical feature shaped to agitate the shopping cart and cause the weight sensor to detect the change in the weight.

10. The method of claim 1, further comprising electronically displaying the inventory on a display in communication with the RFID reader, wherein electronically displaying the inventory comprises displaying one or more of the item quantity, the item identity, an item price, an item promotion, and a total price.

11. The method of claim 1, further comprising detecting a difference between the weight of the one or more items and a total predicted weight, the total predicted weight based on the item identity, the item quantity, and a predicted weight for each of the one or more items.

12. The method of claim 11, further comprising issuing an alert in response to detecting the difference between the weight of the one or more items and the total predicted weight.

13. The method of claim 11, further comprising rescanning the RFID tags of the one or more items with the RFID reader in response to detecting the difference between the weight of the one or more items and the total predicted weight.

14. The method of claim 11, wherein detecting the difference between the weight of the one or more items and the total predicted weight occurs in response to one of detecting the change in the weight of the items and detecting a checkout process initiation.

15. An apparatus comprising:
a detection module that detects a change in a weight of one or more items within a shopping basket, the weight sensed by a weight sensor disposed in the shopping basket, each of the one or more items comprising a radio-frequency identification (RFID) tag;
a scanning module that switches an RFID reader to an active state and scans RFID tags of the one or more items with the RFID reader in response to the detection module detecting the change in weight, the RFID reader disposed on the shopping basket;
an inactive state module that switches the RFID reader to an inactive state subsequent to the scanning module scanning the RFID tags with the RFID reader; and
an inventory determination module that determines an inventory of the one or more items based on information from the scanned RFID tags, the inventory comprising an item quantity and an item identity.

16. The apparatus of claim 15, further comprising a storage module that stores the inventory on a storage device disposed on the shopping basket, the storage device in communication with the RFID reader.

17. The apparatus of claim 15, further comprising a communication module that communicates the inventory to a separate computing device away from the shopping basket.

18. The apparatus of claim 15, further comprising a checkout module that receives the inventory and performs the checkout process based on the inventory.

19. The apparatus of claim 15, further comprising:
a remote storage module that receives the inventory from the shopping basket and stores the inventory at a central server; and
a checkout communication module that communicates the inventory from the central server to a checkout station during a checkout process, the checkout station performing the checkout process based on the inventory.

20. A computer program product comprising a computer readable storage medium having computer readable program code embodied therewith, the computer readable program code for:
detecting change in a weight of one or more items within a shopping basket, the weight sensed by a weight sensor disposed in the shopping basket, each of the one or more items comprising a radio-frequency identification (RFID) tag;
switching an RFID reader to an active state and scanning RFID tags of the one or more items with the RFID reader in response to detecting the change in the weight, the RFID reader disposed on the shopping basket;
switching the RFID reader to an inactive state subsequent to scanning the RFID tags with the RFID reader; and
determining an inventory of the one or more items based on information from the scanned RFID tags, the inventory comprising an item quantity and an item identity.

* * * * *